United States Patent
Avison et al.

(10) Patent No.: US 11,973,181 B2
(45) Date of Patent: Apr. 30, 2024

(54) MULTILAYER NANOPOROUS SEPARATOR

(71) Applicant: LG ENERGY SOLUTION, LTD., Seoul (KR)

(72) Inventors: David W. Avison, Boxborough, MA (US); Steven A. Carlson, Cambridge, MA (US); Benjamin Sloan, Exeter, NH (US)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/543,259

(22) Filed: Dec. 6, 2021

(65) Prior Publication Data

US 2022/0094018 A1     Mar. 24, 2022

Related U.S. Application Data

(63) Continuation of application No. 17/223,845, filed on Apr. 6, 2021, which is a continuation of application
(Continued)

(51) Int. Cl.
*H01M 50/446* (2021.01)
*H01M 10/052* (2010.01)
(Continued)

(52) U.S. Cl.
CPC ..... *H01M 10/0525* (2013.01); *H01M 50/417* (2021.01); *H01M 50/446* (2021.01);
(Continued)

(58) Field of Classification Search
CPC ........... H01M 10/0525; H01M 50/417; H01M 50/446; H01M 50/451; H01M 50/457;
(Continued)

(56) References Cited

U.S. PATENT DOCUMENTS 4,024,323 A    5/1977  Versteegh
6,194,098 B1 * 2/2001  Ying ................... H01M 50/443
                                                    429/251
(Continued)

FOREIGN PATENT DOCUMENTS

WO     2016123404 A1    8/2016

OTHER PUBLICATIONS

F. Sola et al., "A new scanning electron microscopy approach to image aerogels at the nanoscale; A new scanning electron microscopy approach to image aerogels at the nanoscale," Nanotechnology, IOP, Bristol, GB, vol. 22, No. 17, Mar. 16, 2011, p. 175704, XP020188888, ISSN: 0957-4484, DOI: 10,1088/0957-4484/22/17/175704.
(Continued)

*Primary Examiner* — Lisa S Park
(74) *Attorney, Agent, or Firm* — Amster, Rothstein & Ebenstein LLP

(57) ABSTRACT

A separator for a lithium battery having (a) a porous polymeric layer, such as a polyethylene layer; and (b) a nanoporous inorganic particle/polymer layer on both sides of the polymeric layer, the nanoporous layer having an inorganic oxide and one or more polymers; the volume fraction of the polymers in the nanoporous layer is about 15% to about 50%, and the crystallite size of the inorganic oxide is 5 nm to 90 nm.

12 Claims, 6 Drawing Sheets

Related U.S. Application Data

No. 16/755,294, filed as application No. PCT/US2018/055862 on Oct. 15, 2018, now Pat. No. 10,998,536.

(60) Provisional application No. 62/572,083, filed on Oct. 13, 2017.

(51) Int. Cl.
 H01M 10/0525 (2010.01)
 H01M 50/417 (2021.01)
 H01M 50/451 (2021.01)
 H01M 50/457 (2021.01)
 H01M 50/489 (2021.01)
 H01M 50/491 (2021.01)

(52) U.S. Cl.
 CPC ....... H01M 50/451 (2021.01); H01M 50/457 (2021.01); H01M 50/489 (2021.01); H01M 50/491 (2021.01)

(58) Field of Classification Search
 CPC .............. H01M 50/489; H01M 50/491; H01M 10/052; H01M 2300/0025; Y02E 60/10
 See application file for complete search history.

(56) References Cited

U.S. PATENT DOCUMENTS

| | | | |
|---|---|---|---|
| 6,432,586 B1 | 8/2002 | Zhang | |
| 6,723,467 B2 | 4/2004 | Yoshida et al. | |
| 7,638,241 B2 | 12/2009 | Lee et al. | |
| 7,662,517 B2 | 2/2010 | Lee et al. | |
| 7,709,152 B2 | 5/2010 | Kim et al. | |
| 7,883,799 B2 | 2/2011 | Seo et al. | |
| 8,318,360 B2 | 11/2012 | Seo et al. | |
| 9,293,752 B2 | 3/2016 | Murata et al. | |
| 9,312,527 B2 | 4/2016 | Muramatsu et al. | |
| 9,478,784 B2 | 10/2016 | Iwase | |
| 9,484,565 B2 | 11/2016 | Miyazaki et al. | |
| 9,543,077 B2 | 1/2017 | Honda et al. | |
| 9,847,519 B2 | 12/2017 | Pekala et al. | |
| 2007/0190427 A1 | 8/2007 | Carlson et al. | |
| 2009/0067119 A1* | 3/2009 | Katayama | H01M 50/403 361/523 |
| 2011/0003209 A1 | 1/2011 | Katayama et al. | |
| 2011/0165450 A1 | 7/2011 | Nishikawa | |
| 2015/0155601 A1 | 6/2015 | Nakatsutsumi et al. | |
| 2016/0043370 A1 | 2/2016 | Hatta et al. | |
| 2016/0104876 A1 | 4/2016 | Avison et al. | |
| 2016/0172705 A1 | 6/2016 | Hoshiba | |
| 2017/0012264 A1 | 1/2017 | Carlson et al. | |
| 2017/0294638 A1 | 10/2017 | Joo et al. | |
| 2017/0301903 A1 | 10/2017 | Choi et al. | |
| 2017/0373295 A1 | 12/2017 | Kim et al. | |
| 2018/0019457 A1 | 1/2018 | Alharizah et al. | |
| 2018/0248164 A1 | 8/2018 | Pekala et al. | |

OTHER PUBLICATIONS

Chongwen Yang et al., "Boehmite particle coating modified microporous polyethylene membrane: A promising separator for lithium ion batteries," Journal of Power Sources, vol. 348, Mar. 3, 2017, pp. 80-86, XP029949881, ISSN: 0378-7753, DOI: 10.1016/J.POWSOUR.2017.02.078.

International Search Report received for PCT Patent Application No. PCT/US2018/055862, dated Apr. 11, 2019, 6 pages.

Written Opinion received for PCT Patent Application No. PCT/US2018/055862, dated Apr. 11, 2019, 13 pages.

1 Chinese Office Action dated Apr. 12, 2022 issued in Chinese Patent Application No. 201880079213.4.

Communication Pursuant to Article 94(3) EPC dated Sep. 8, 2023 issued in European Patent Application No. 18 799 922.2.

\* cited by examiner

MULTILAYER NANOPOROUS SEPARATOR

CROSS-REFERENCE TO RELATED APPLICATIONS

This application is a continuation of U.S. patent application Ser. No. 17/223,845, filed on Apr. 6, 2021, which is a continuation of U.S. patent application Ser. No. 16/755,294, filed on Apr. 10, 2020 (now U.S. Pat. No. 10,998,536), which is a U.S. national stage entry under 35 U.S.C. § 371 of PCT International Patent Application No. PCT/US2018/055862, filed on Oct. 15, 2018, which claims the benefit of and priority to U.S. Provisional Patent Application No. 62/572,083, filed on Oct. 13, 2017, the entire contents of which are incorporated by reference herein.

FIELD OF THE INVENTION

The present invention relates generally to porous separators for batteries and other electric current producing cells. In particular, it pertains to multilayer porous separators comprising inorganic oxide/polymer layers on a polymeric layer, and to lithium batteries comprising such separators.

BACKGROUND OF THE INVENTION

Lithium batteries are widely used in portable electronics, such as smartphones and portable computers. Among the new applications for lithium batteries are high power batteries for hybrid, plug-in hybrid, and fully electric vehicles. Existing lithium batteries, including rechargeable and non-rechargeable lithium batteries, often utilize multilayer separators. Such separators may include an extruded polyethylene or polypropylene porous film that is coated with an inorganic oxide/polymer coating layer. As the demand for lower cost lithium batteries with increased size and energy density has grown, manufacturers have turned to less safe battery active materials in order to meet these goals. This has resulted in a need for battery separators with increased dimensional stability at temperatures such as 150° C., or higher.

Thus, it would be advantageous if the inorganic oxide/polymer coating layers could provide even greater dimensional stability at elevated temperatures while, at the same time, requiring lower coating weights and coating thicknesses, and providing lower manufacturing costs.

SUMMARY OF THE INVENTION

It is an object of the present invention to provide lighter weight, lower cost, and thinner inorganic oxide/polymer coating layers for polymer-based separators for lithium batteries and other electric current producing cells.

The present invention achieves these goals by providing a separator for a lithium battery comprising: (a) a porous polymeric layer, and (b) nanoporous inorganic oxide/polymer composite layers coated on both sides of the polymeric layer. In one embodiment, the nanoporous layer comprises an inorganic oxide (e.g., boehmite, $SiO_2$) and one or more polymers, wherein the volume fraction of the one or more polymers in the solid portion of the nanoporous layer may be about 10% to about 50%, and preferably about 12% to about 45%, and wherein the crystallite size of the inorganic oxide particles is 5 nm to 90 nm. This combination of inorganic oxide particles (e.g., boehmite particles) having an extremely small crystallite size, and a high volume of organic polymer, produces a porous heat stable layer that provides increased dimensional stability at high temperature and a high level of porosity for excellent ionic conductivity of the electrolyte in the pores of the separator. This combination was further found to enable a significantly lower coating weight and coating thickness of the heat stable layer.

In another embodiment the nanoporous layer comprises: (a) a blend of inorganic oxide particles (e.g., boehmite particles) and inorganic nitride particles (e.g., boron nitride or aluminum nitride particles), and (b) one or more polymers, wherein the volume fraction of the one or more polymers in the solid portion of the nanoporous layer may be about 10% to about 50%, and preferably about 12% to about 45%, and wherein the crystallite size of the inorganic particles is 5 nm to 90 nm. This combination of: (1) inorganic oxide and nitride particles (e.g., boehmite and boron nitride or aluminum nitride particles) having extremely small crystallite sizes, and (2) a high volume of organic polymer, produces a porous heat stable layer that provides increased dimensional stability at high temperature and a high level of porosity for excellent ionic conductivity of the electrolyte in the pores of the separator.

Preferably, the heat stable inorganic oxide/polymer layer (or inorganic oxide and nitride/polymer layer) is coated on both sides of the porous polymeric layer, such as a porous polyethylene layer or a porous polypropylene layer, as opposed to being on only one side of the polymeric layer. It has been found that this approach provides improved thermal dimensional stability in a thin and low cost separator. However, having the heat stable layer on only one side of the polymeric layer is also useful.

Another aspect of the separators for a lithium battery of this invention relates to a separator comprising (a) a porous polymeric layer, and (b) a nanoporous inorganic oxide/polymer composite layer on one or both sides of the polymeric layer, wherein the nanoporous layer comprises an inorganic oxide (e.g., boehmite, $SiO_2$) and a polymer, and wherein the crystallite size of the inorganic oxide is 5 nm to 25 nm. It has been found that this smaller crystallite size results in a thinner coating layer with more cohesive strength and with more adhesion to the polymeric layer at an even lower coating weight than comparable layers where the crystallite size for the inorganic oxide is larger such as, for example, about 80 nm.

In another embodiment, the present invention includes lithium batteries that comprise the improved separators of this invention.

A further aspect of the present invention are methods for making separators that comprise coating a solution comprising an inorganic oxide and/or inorganic nitride, and one or more polymers, on one or both surfaces of a porous polymeric layer to form the separators of this invention.

BRIEF DESCRIPTION OF THE DRAWINGS

The features and advantages of the present disclosure will be more fully understood with reference to the following, detailed description when taken in conjunction with the accompanying figures, wherein.

DETAILED DESCRIPTION

Figure 1:
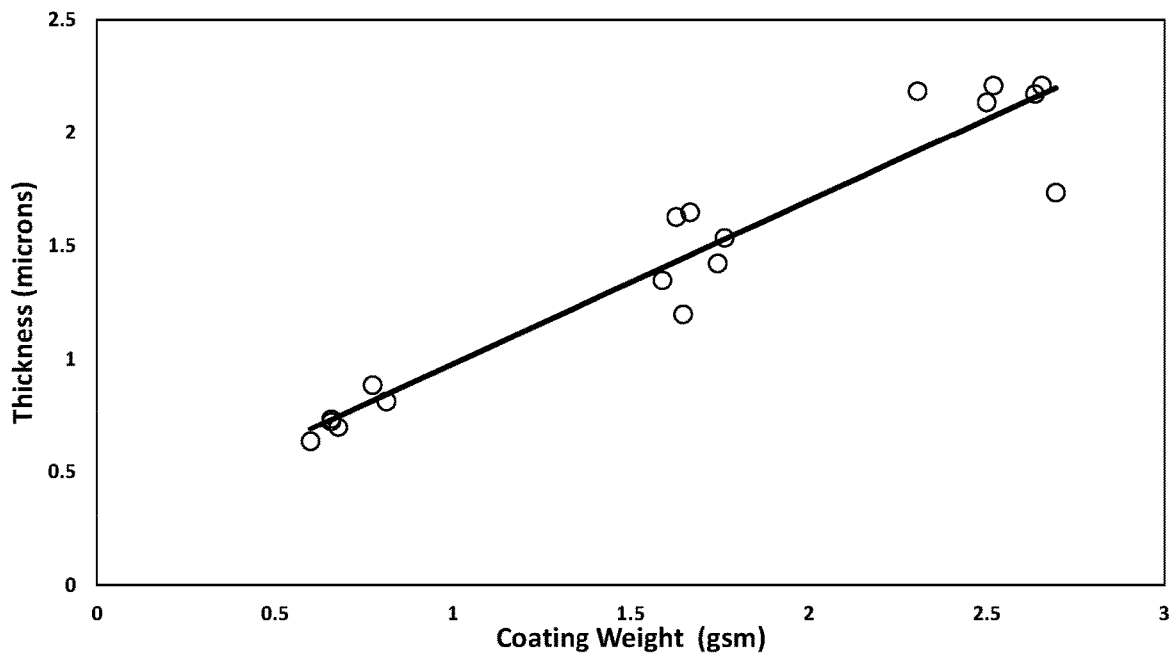
FIG. 1 is a graph of the coating thickness as a function of coating weight of a nanoporous separator, according to an embodiment of the present invention made in accordance with Example 1.

The separators of the present invention provide superior safety, lower cost, lower thickness, and other key performance properties for use in lithium batteries and in other electric current producing cells.

One aspect of this invention pertains to a separator for a lithium battery comprising (a) a porous polymeric layer, and (b) a nanoporous inorganic oxide/polymer composite layer on both sides of the polymeric layer, wherein the nanoporous layer comprises boehmite and one or more polymers, wherein the volume fraction of the one or more polymers in the solid portion of the nanoporous layer may be about 10% to about 50%, and preferably about 12% to 45%, and wherein the crystallite size of the boehmite is 5 nm to 90 nm. Alternatively, the nanoporous layer may further comprise other inorganic oxide (e.g., $SiO_2$) or nitride (e.g., BN or AlN) particles, or combinations thereof.

The term "lithium battery" may include, for example, batteries in which the electroactive anode material comprises lithium. This includes, but is not limited to, secondary or rechargeable lithium ion batteries, secondary lithium metal batteries, and primary or non-rechargeable lithium metal batteries.

The term "separator" may include, for example, porous materials in a battery that are interposed between the cathode and the anode of the battery to provide electrical insulation against short circuiting and to provide pores for filling with the electrolyte of the battery.

The term "porous polymeric layer" may include, for example, a layer of a polymer material that is porous such that it has permeability to the flow of air through the polymeric layer. The battery industry typically measures this air permeability using a porosimeter that provides a value for the time in seconds for 100 cubic centimeters (cc) of air to pass through the porous layer. This value is commonly called the Gurley number. The battery industry prefers that the Gurley number for a separator be as low as possible without sacrificing mechanical integrity. Typical Gurley numbers for the air permeability of porous polyethylene or porous polypropylene separators, as used in the battery industry, are 100 seconds/100 cc to 300 seconds/100 cc. For this invention, porous polymer layer does not include any of the non-woven polymeric layers, such as with polyester fibers, that are used as separators in the battery industry.

The term "nanoporous" may include layers having pores up to about 100 nm in diameter, preferably, with at least 90% of the pores being less than 100 nm in diameter. The size and relative number of pores can be measured by mercury porosimetry, or by scanning electron microscope (SEM) or transmission electron microscope (TEM) cross-sections of the layer.

As discussed herein, the nanoporous layer may be present on both sides of a substrate, support, layer, or coating. For example, the nanoporous layer may be present on both sides of the porous polymeric layer, such as a porous polyethylene layer. The general benefits of the nanoporous layers of this invention are also found when the nanoporous layer is present on only one side of the porous polymeric layer, but the overall performance is typically superior when the nanoporous layer is present on both sides of the porous polymeric layer.

The superior performance features of two-side coating of the polymeric layer, compared to one-side coating at the same total coating weight, includes lower shrinkage at high temperatures and improved battery safety. Improved safety is typically the most important performance feature desired in separators for lithium batteries, especially as the batteries become larger and higher in energy density and use less safe battery active materials in order to achieve higher energy densities and lower costs.

Another advantage of two-side coating of the porous polymeric layer with the nanoporous coating layer is that it provides the opportunity to make the coatings on each side different in composition. This enables the nanoporous layer to be optimized for the best performance when it is facing the anode and when it is facing the cathode. In general, by tailoring the formulations and coating thicknesses of the ceramic coatings on either side of the separator, it is possible to optimize: (a) adhesion between separator and a specific electrode, either anode or cathode; (b) interfacial impedance between separator and a specific electrode, either anode or cathode; (c) complexation of migratory species (e.g., solubilized transition metal ions from cathode).

For example, when the coating is facing the cathode, it is particularly useful that the coating be resistant to oxidation, especially at higher charge voltages, e.g., above 4.25 volts. This can be done, for example, by selecting the organic polymer of the nanoporous layer to be resistant to oxidation up to the higher voltage desired, e.g., up to 5.0 volts. In addition, the nanoporous layer on one of the sides can be designed with particularly small pore sizes, such as under 10 nm diameter pores, for example, by using boehmite with a primary crystallite size of less than 10 nm in diameter. It should be understood that the present invention is not limited to the examples provided herein. For example, surface-modified alumina particles, including boehmite particles, as described in PCT/IB2015/000272 to Loscutova et al. of Sasol, may be utilized in the separator layers described herein. This patent application discloses the dispersion of these surface-modified aluminas into nano-sized single particle crystallites. This reference also describes that the average crystallite size can be measured by X-ray diffraction on a 120 plane. As an example, the crystallite size (or an average crystallite size) of the inorganic particles in a separator comprising a nanoporous layer according to an embodiment of the invention may be measured by: (i) taking a cross-section sample of the nanoporous layer; (ii) using a TEM or very high power SEM on this sample to measure the diameter/width, in their widest dimension, of 100 single primary (inorganic) particles selected at random in the TEM or SEM image; (iii) excluding the 25 highest and 25 lowest diameter numbers in the 100 diameter/width numbers; and (iv) recording the crystallite size as the average of the middle 50 diameter/width numbers, i.e., an average crystallite size of the measured particles. Since the pore size diameters of ceramic particles in a nanoporous layer usually approximate the crystallite size of the ceramic particles, such as boehmite particles, used to make the nanoporous layer, the pore size diameters may indicate the crystallite size of the ceramic particles for nanoporous layers containing ceramic particles of a narrow crystallite size. However, for blends of ceramic particles of different crystallite sizes in a nanoporous coating, the pore size diameters of the coating layer typically are intermediate, or a blend, among the crystallite size diameters of the different ceramic particles and not individual peaks reflecting the different crystallite sizes. The TEM or SEM method described above for measuring the crystallite size does not have this limitation since it is analyzing single particles, and not blends, and thus is a preferred method to use for this invention. These separator configurations using very small pore sizes are useful when placed against a lithium metal anode, where the very small size of the pores assists in preventing the growth of lithium metal dendrites into and through the separator, which reduces cycle life, capacity, and safety for the cell. Where very small boehmite particles are used and some of these boehmite particles penetrate into the pores of the polymeric separator substrate, this is particularly useful in preventing the growth of lithium metal dendrites into and through the separator.

In another example, boehmite could be modified by reaction with a fluorinated ethylene carbonate for improved cycle life when such nanoporous layer is positioned against an anode comprising silicon or lithium metal. This nanoporous layer with the boehmite covalently reacted with a fluorinated ethylene carbonate could also be used against the cathode to help achieve excellent stability under high voltage operation of the cell, such as at up to 5.0 volts.

In a further example, the nanoporous layer with pores that are less than 10 nm in diameter could be positioned against the cathode to inhibit the diffusion of transition metals, such as nickel ions, from the cathode to the anode, which degrades the cycle life and other performance properties of the cell. Optionally, the very small boehmite crystallite size of less than 10 nm could be combined with reaction of this boehmite with fluorinated ethylene carbonate or another organic carbonate to make a nanoporous layer positioned against the cathode to lessen the diffusion of transition metal ions from the cathode.

The term "Boehmite" is understood in the art. It, for example, may include hydrated aluminum oxide of the empirical chemical formula of $Al_2O_3 \cdot H_2O$ where x is 1.0 to 2.0. Another term used interchangeably herein for boehmite is AlOOH. Boehmite may be characterized by its distinctive Fourier-transform infrared spectroscopy ("FTIR") fingerprint. Boehmite may also be characterized by its distinctive X-ray diffraction pattern and by its distinctive infrared spectrum of double peaks of hydroxyl groups around 3200 $cm^{-1}$. Boehmite may have values of x for molecules of water that are above 1.5 and even up to about 2. However, the commercial grades of boehmite of all particle sizes typically have a value of x that is in the range of 1.0 to 1.5. The value of x can be measured by first drying the boehmite at about 120° C. for 1 hour to remove the surface adsorbed water and then measuring the loss of water that occurs when the boehmite sample is heated to 1000° C. for 1 hour and is thereby dehydrated to anhydrous aluminum oxide, $Al_2O_3$.

Examples of polymers that may be utilized in the present invention include, but are not limited to, cellulosic polymers such as hydroxyethyl cellulose, vinyl pyrrolidone polymers and copolymers, polysaccharides such as chitosan, polyethylene oxides, and polyvinyl alcohols. Preferably, the polymers, alone or in combination, provide cohesive and adhesive strength to the nanoporous layer, are insoluble in the electrolyte of the lithium battery, and are electrochemically stable over the voltage range of use of the lithium battery. If needed to achieve these properties, one or more of the polymers may be crosslinked.

By the term "volume fraction of the one or more polymers in the solid portion of the nanoporous layer" is meant the fraction expressed as a percentage by volume of the polymer content of the solid portion of the inorganic particle/polymer composite layer. As described hereinafter, the nanoporous layer has a % porosity of between about 30% to about 70%. In other words, much of the volume of the nanoporous layer is air, and not a solid material. The air volume (e.g., pores) is not included in the solid portion for purposes of determining the volume fraction of the one or more polymers in the solid portion of the nanoporous layer. The volume fraction of the polymer and inorganic particle content of the nanoporous layer can be calculated based on the relative densities of the materials. For example, when the inorganic particles are only boehmite with a density of 3.03 g/cc, the organic polymer has a density of 1.3 g/cc, and the weight ratio of the hoehmite to the organic polymer is 12:1, the volume fraction of boehmite would be 83.7% and the volume fraction of organic polymer would be 16.3%, Changing the weight ratio of the hoehmite to the organic polymer to 4:1 results in a volume fraction of boehmite of 63.2% and of organic polymer of 36.8%, If the density of the organic polymer is lower, such as 1.1 g/cc, then its volume fraction at the same weight ratio of inorganic particle/polymer will be higher than at the higher polymer density of 1.3 g/cc. To determine the volume fraction of one or more organic polymers in the solid portion of the nanoporous layer, for example, the nanoporous layer is removed from the separator, such as by careful scraping of the layer and not removing any of the polymer substrate. Next, a weighed nanoporous layer sample in a crucible is combusted at a sufficient temperature to combust the organic polymer to leave the residue of the ceramic particles. This provides the weight of combusted ceramic particles. When the particles are only boehmite, this weight of the combusted residue is divided by 0.85 in the case of the equivalent of one water molecule per boehmite molecule to obtain the weight of boehmite in the sample prior to the combustion. Although most boehmite particles have a 15% weight loss upon combustion, it should be noted that boehmite particles may have a different weight loss factor, such as 0.84 or 0.82. This same information can be obtained by using a thermogravimetric analyzer to record the weight of the nanoporous layer sample as it is heated to 900° C. or higher, until a constant weight is achieved. As noted above, boehmite has a density of 3.03 g/cc. Most organic polymers have a density in the range of 1.1 to 1.4 g/cc, although some polymers, such as polyvinylidene difluoride (PVdF), have a density of about 1.8 g/cc. After the density of the organic polymers is known by analyzing for the identity and weight ratios of the organic polymers, for boehmite-only nanoporous layers, the volume % of the organic polymers in the solid portion of the nanoporous layer can be calculated. For example, if the weight percent of boehmite is 88.9%, and the weight percent of the organic polymers is 11.1% and its density is 1.3 g/cc—with a pigment:binder ratio of 8:1 by weight—dividing the weight percents of boehmite and the organic polymers by their densities gives relative volume percents of 29.34% for boehmite and 8.54% for the organic polymers. Normalizing these volume percents to a total volume percent of 100% for the solid portion of the nanoporous layer gives a volume percent of 22.54% for the organic polymers. If the nanoporous layer is a blend of boehmite and other ceramic particles or if the density of the organic polymers is not known, further analysis, as known in the art, may be undertaken to measure the volume percent of the organic polymers.

The term "crystallite size" of the particles refers to the average size of the primary or single crystals of the inorganic particles. This is typically measured using X-ray diffraction, a transmission electron microscope (TEM), or a very high resolution scanning electron microscope (SEM), PCT/IB2015/000272 to Loscutova et al. of Sasol cited above provides examples of using X-ray diffraction to determine an average size of the crystals of the inorganic particles, such as alumina and boehmite. As described earlier, a TEM or SEM method may be used to determine the crystallite size. Many inorganic oxide particles, such as boehmite particles, are nearly cubic in shape, although they can have other shapes such as platelets and needles. In the dry solid state and in solution, boehmite particles are typically agglomerated into larger particles comprised of many primary boehmite particles, such as, for example, 10 to 20 primary particles. The inorganic particles in the nanoporous layers of this invention result in features, such as pore size diameter, that are related to the crystallite size of the particles.

In one embodiment of the separators of the present invention, the ratio of the total thickness of the nanoporous layer on both sides of the polymeric layer to the total thickness of the separator is 10% to 80%. The thickness of these layers may be measured by SEM analysis of cross-sections of the separator. Because of the nanoporous pore sizes and the high volume fraction of organic polymer in the nanoporous layer, it has been found that a lower limit for the proportional thickness of the nanoporous layer of about 10% of the total thickness of the separator, rather than 15% or more typically 25%, is able to provide an excellent improvement in the dimensional stability of the separator at high temperatures, which is needed for improved safety. It has been found that the combination of nanoporous pore sizes and very high volume fractions of organic polymer in the nanoporous layer (e.g., from about 10% to about 50%) provides acceptable % porosity (e.g., from about 30% to about 70%) with good ionic conductivity of the electrolyte. It has also been found that the separator of this invention functions well with the total thickness of the nanoporous layer as high as 80% of the total thickness of the separator.

In one embodiment, the heat shrinkage of the separator at 150° C. for 1 hour is less than 5%. This heat shrinkage may be measured by the change in the area of the separator after heating in an oven for 1 hour. This measurement of the heat shrinkage may be done by hanging a large sheet of the separator in the oven after marking and measuring the dimensions and area of a square or rectangle such as a 10 cm by 10 cm square, on a smaller section of the large sheet. After the heating in the oven, the marked area is measured for the % change or % shrinkage of the dimensions and the area.

In one embodiment, the heat shrinkage of the separator at 200° C. for 1 hour is less than 5%. The nanoporous separators of the present invention have been found to retain their dimensional stability even when heated well above the melting point of the polymeric layer, such as a porous polyethylene layer.

In one embodiment of the separators of this invention, the total coating weight of the nanoporous layer on both sides is less than 4.5 grams per square meter (gsm), while providing a heat shrinkage of the separator at 150° C. for 1 hour of less than 5%. It should be noted that the use of boehmite with its lower density of about 3.03 g/cc, as compared to the higher density anhydrous aluminum oxide or alumina (which has a density of about 4 g/cc), helps to further lower the coating weight of the heat stabilizing layer. The lower density of the inorganic oxide particle proportionately lowers the weight of coating needed for a specific thickness and % porosity.

For example, a 4 micron thick alumina/polymer layer with a 45% porosity for polyethylene-based separators typically weighs about 8 grams per square meter (gsm). However, switching to boehmite (or a blend of boehmite and other inorganic particles of a similar or lower density) at the same thickness and % porosity lowers the coating weight to about 6 gsm or less. The high volume fraction of polymer in the nanoporous layers of the separators of this invention, combined with the use of boehmite with a crystallite size of 5 nm to 90 nm, provides increased dimensional stability for a specific thickness of the separator layer. Although it is possible to still make the total thickness of the inorganic particle/polymer layer in the separator 4 microns or higher, it is desirable for lower cost and for lower total thickness of the separator to make the thickness of the inorganic particle/polymer layer as thin as possible, such as about 3 microns total, while still achieving an excellent dimensional stability at high temperature. In one embodiment, the heat shrinkage of the separator at 200° C. for 1 hour is less than 5%.

In one embodiment, other inorganic oxides and/or inorganic nitrides with a density of about 3.0 g/cc or lower, such as silicon dioxide and boron nitride, may be blended with the boehmite pigment. As discussed further below, this provides lower total coating weight of the nanoporous layer and other desirable properties, such as lower water content.

In another embodiment of the separators of this invention, the total coating weight of the nanoporous layer of both sides is less than 3.5 grams per square meter (gsm), while providing a heat shrinkage of the separator at 150° C. for 1 hour of less than 5%, In one embodiment, the heat shrinkage of the separator at 200° C. for 1 hour is less than 5%.

In one embodiment of the separators of the present invention, the crystallite size of the inorganic particles may be about 30 nm to about 50 nm, preferably about 5 nm to about 25 nm, and more preferably about 5 nm to about 10 nm. In one embodiment, the inorganic particles comprise boehmite particles having a crystallite size of about 30 nm to about 50 nm. In one embodiment, the crystallite size of the boehmite may be about 5 nm to about 10 nm, and preferably about 5 nm to about 8 nm.

In another embodiment of this invention, the % porosity of the nanoporous layer is between 30% and 55%. The % porosity of the nanoporous layer may be calculated from the density in g/cc of the materials in the dry coating assuming it is a 100% solid coating with 0% porosity and comparing it to the actual density of the coating. The actual density of the nanoporous layer may be calculated by dividing its coat weight in gsm by its coating thickness to provide the density in g/cc of the nanoporous layer. Dividing the density of the nanoporous layer by the calculated density of the same materials in a non-porous layer and multiplying by 100% provides the % solid fraction by volume in the nanoporous layer. Subtracting this value of the % solid fraction from 100% gives the % pore volume or % porosity of the nanoporous layer. The % porosity can also be measured by mercury porosimetry analysis.

In one embodiment, the pore volume of the nanoporous layer is between 0.8 cc/g and 1.0 cc/g. The pore volume can be calculated by measuring the coat weight of the nanoporous layer in gsm and measuring the thickness of the nanoporous layer to determine the total cc in a square meter. The pore volume in cc/g is then calculated by dividing the total cc in a square meter by the grams of the gsm measurement. In one embodiment, the % porosity of the nanoporous layer is 55% to 70%. Above this level of % porosity, it is difficult to obtain the cohesive and adhesive strength of the nanoporous layer that are preferred for long term, safer lithium battery separator applications.

In one embodiment of the separators of the present invention, the volume fraction of the one or more polymers in the solid portion of the nanoporous layer is 15% to 45%. In one embodiment, the volume fraction of the one or more polymers in the solid portion of the nanoporous layer is 20% to 45%. In one embodiment, the volume fraction of the one or more polymers in the solid portion of the nanoporous layer is 25% to 45%.

In one embodiment of the separators of this invention, the nanoporous layer comprises pores having an average pore diameter of 80 nm or less and at least 70% of the pores have a diameter less than 80 nm. In one embodiment, the nanoporous layer comprises pores having an average pore diameter of 50 nm or less and at least 70% of the pores have a diameter less than 50 nm. In one embodiment, the nanoporous layer comprises pores having an average pore diameter of 25 nm or less and at least 70% of the pores have a diameter less than 25 nm.

In one embodiment of the separators of this invention, the ratio of the air permeability of the separator to the air permeability of the polymeric layer without any nanoporous layer present is 1.0 to 1.4. As described hereinabove, this air permeability is typically measured on an instrument which provides a Gurley number of the number of seconds for 100 cc of air to pass through the separator. A low level of increase of the air permeability is an important indicator of an expected low decrease in the ionic conductivity of electrolyte in the separator due to adding the inorganic oxide/polymer layer. If the ionic conductivity decreases too much, this can interfere with the cycling rate capability of the lithium battery particularly its power rate properties, and also interfere with the cycling lifetime of the lithium battery.

In one embodiment of the separators of the present invention, the polymeric layer comprises a polyolefin. Suitable polyolefins include, but are not limited to, polyethylenes and polypropylenes. Other examples of the polyolefin polymers include, but are not limited to, homopolymers of 1-butene, 1-pentene, 1-hexene, and 1-octene, as well as copolymers and terpolymers thereof, used alone or in combination with one or more types of polymers. In one embodiment, the polymeric layer comprises polyethylene. The polymeric layer may be of the "wet process" type which is produced by extrusion followed by solvent extraction to provide the porosity or of the "dry process" type which is produced by extrusion followed by stretching to provide the porosity. Various molecular weights, densities, and stereochemistries of polyethylene and the other polymers, with various melt flow and mechanical properties, may be utilized in the porous polymeric layers.

For the purposes of better unithrm wetting of the coating fluid of the nanoporous layer and of better adhesion of the nanoporous layer to the substrate, the porous polymeric layer may have a coating layer on the surface to which the nanoporous layer is applied.

In one embodiment of the separators comprising polyethylene in the polymeric layer, the heat shrinkage of the separator at 120° C. for 1 hour is less than 1.0%. Without the nanoporous layer of the separators of this invention, the heat shrinkage of a polyethylene separator of comparable total thickness is typically greater than 1.0% at 105° C. In one embodiment, the ratio of the air permeability of the separator after the heat shrinkage at 120° C., for 1 hour to the air permeability of the separator before the heat shrinkage at 120° C. is 0.8 to 1.2. This is an important feature for allowing vacuum drying of the polyethylene-based separators of this invention at a higher temperature of 120° C., without any negative effect on the air permeability and ionic conductivity and, in some cases, with a positive effect on ionic conductivity due to the heat treatment. Vacuum drying is beneficial for lowering the moisture content of separators for increased lithium battery cycling lifetimes and capacities and for higher lithium battery cycling rate capabilities. Vacuum drying is typically done for 4 to 24 hours at about 80° C. for polyethylene separators and at about 90° C. for polyethylene separators with one or more inorganic oxide/polymer layers. The capability of using a higher temperature of 120° C. and a shorter drying time of 1 to 3 hours for the polyethylene-based separators of this invention is useful.

In another embodiment of the separators of the present invention, the nanoporous layer is a laminated layer on the polymeric layer. By the term "laminated layer" is meant that the nanoporous layer is not initially formed on the polymeric layer, such as by direct coating, but is instead laminated to the polymeric layer in a subsequent step. For example, the nanoporous layer is coated on a release substrate, and then this nanoporous layer is transferred by lamination onto the polymeric layer. This lamination may optionally include the use of heat and/or the use of some organic solvent to adhere the nanoporous layer to the polymeric layer and to aid in the subsequent delamination of the release substrate without interfering with the quality of the laminated multilayer separator.

Another aspect of the separators for a lithium battery of this invention relates to a separator comprising (a) a porous polymeric layer, and (b) a nanoporous inorganic particle/polymer composite layer on one or both sides of the polymeric layer, wherein the nanoporous layer comprises an inorganic oxide (e.g., boehmite), or a blend of an inorganic oxide and an inorganic nitride (e.g., BN or AlN), and a polymer, and wherein the crystallite size of the inorganic particles is about 5 nm to about 25 nm, and preferably about 5 nm to about 8 nm. In one embodiment, the nanoporous layer comprises pores having an average pore diameter of about 25 nm or less and at least about 70% of the pores have a diameter of about 25 nm or less.

A further aspect of the separators for a lithium battery of the present invention pertains to a separator comprising (a) a porous polyethylene layer, and (b) a nanoporous inorganic particles/polymer composite layer on both sides of the polyethylene layer, wherein the nanoporous layer comprises boehmite, or a blend of boehmite and boron nitride, and one or more polymers, the volume fraction of the one or more polymers in the solid portion of the nanoporous layer is about 10% to about 50%, the total coating weight of the nanoporous layer on both sides is 5.5 grams per square meter or less, and the heat shrinkage of the separator at 150° C. for 1 hour is less than 5%. In one embodiment, the total coating weight of the nanoporous layer on both sides is 3.5 grams per square meter or less and the thickness of the polyethylene layer is between 5 microns and 16 microns.

In another embodiment, this invention is lithium batteries comprising a separator of the present invention.

Another aspect of the present invention are methods for making the separator of this invention, which method comprises coating a solution comprising inorganic particles and one or more polymers on one or both surfaces of a porous polymeric layer. In one embodiment, the inorganic particles comprise boehmite particles having a crystallite size of 5 nm to 90 nm. In one embodiment, the boehmite particles have a crystallite size of about 5 nm to about 25 nm, and preferably about 5 nm to about 8 nm. In one embodiment, the volume fraction of the one or more polymers in the solid portion of the coating after drying is about 10% to about 50%, preferably about 12% to about 45%, and more preferably about 15% to about 45%.

EXAMPLES

Several embodiments of the present invention are described in the following examples, which are offered by way of illustration and not by way of limitation.

Example 1

A boehmite slurry was prepared by adding 12 parts of boehmite (DISPAL 10F4 supplied by Sasol Inc., Houston, Texas) and 1 part of chitosan (deacetylated poly(D-glucosamine), medium molecular weight, of a polysaccharide supplied by Sigma-Aldrich, St. Louis, MO) to 73 parts of 9:1 water:isopropyl alcohol and stirring the slurry. The primary particle size of the boehmite was about 40 nm. The boehmite slurry was coated onto both sides of a 12 micron thick porous polyethylene separator (EP12 supplied by ENTEK, Lebanon, Oregon) using wire-wound rods of different wire thicknesses to obtain a range of coating weights for both sides from about 1.2 grams per square meter (gsm) to about 5.2 gsm. The boehmite coating was first applied to one side of the polyethylene separator and dried at 70° C. for 2 minutes in a convection oven. The boehmite coating was then applied to the reverse uncoated side of the polyethylene separator and dried under the same oven heating conditions as for the first coating.

The 12:1 by weight ratio of boehmite pigment to chitosan binder is calculated to have 15.3% by volume of chitosan binder in the solid portion of the porous boehmite coating layer. This calculation is based on a specific gravity of 3.03 g/cc for boehmite and of 1.4 g/cc for chitosan.

The coating thickness was measured using a Dorsey gauge on the polyethylene separator before and after the coating of the boehmite coating on both sides. The difference in the thickness values before and after the coating is the coating thickness in microns. An alternative method for measuring the coating thickness is using the Dorsey gauge on the coated separator before and after removing the boehmite coating on both sides, either by pulling off the coating with an adhesive tape or by rubbing off the coating with an alcohol-soaked cloth.

The coating weight was measured by weighing a 10 cm×10 cm sample of the polyethylene separator before and after the coating of the boehmite coating on both sides. The difference in the weights before and after the coating multiplied by 1,000 is the coat weight in grams per square meter (gsm). An alternative method for measuring the coating weight was weighing a 10 cm×10 cm sample of the coated separator before and after removing the boehmite coating on both sides, either by pulling off the coating with an adhesive tape or by rubbing off the coating with an alcohol-soaked cloth.

FIG. 1 shows a plot of the average boehmite coating thickness and coating weight per side of about 0.6 gsm to about 2.6 gsm. For two sided coatings, these numbers are doubled to give a total coating weight range of about 1.2 gsm to about 5.2 gsm. The total boehmite coating thickness for both sides varies from about 1.2 microns to about 4.4 microns. If a more accurate measurement of the coating thickness is desired, scanning electron microscope (SEM) analysis of cross-sections of the boehmite-coated plastic separator can be utilized.

Using a SEM analysis for the total coating thickness showed a density of about 1.06 gsm per micron of coating thickness. From this, the % porosity for this 12:1 pigment to binder ratio is estimated as 62%.

Figure 2:
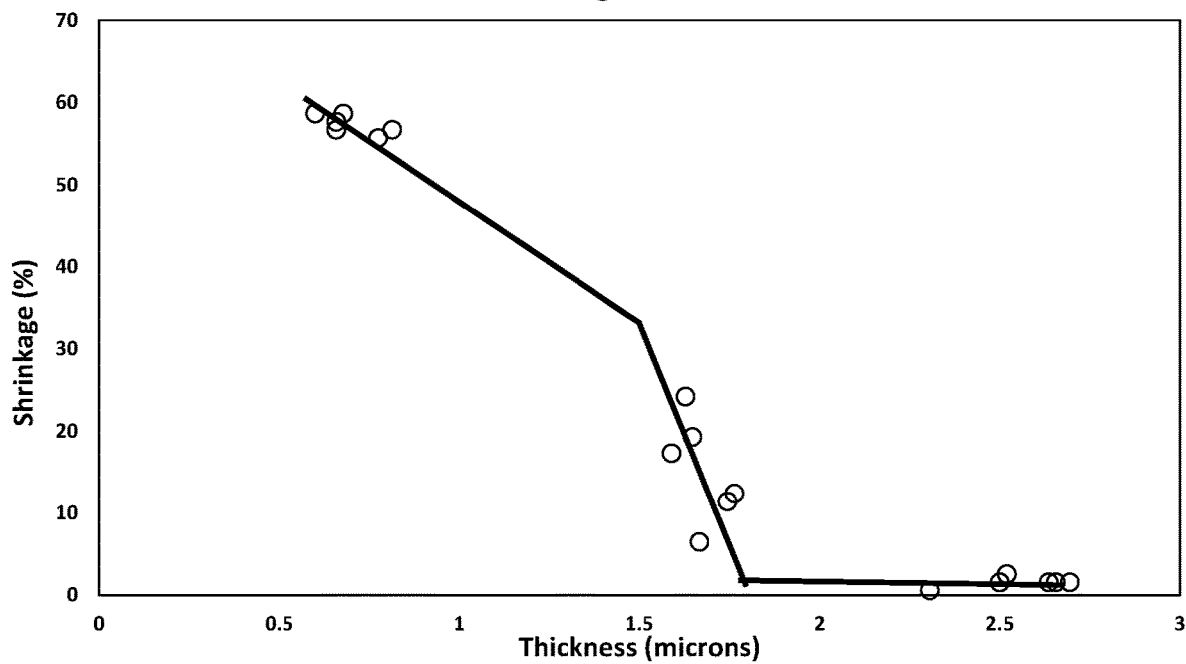
FIG. 2 is a graph of the shrinkage as a function of coating thickness of a nanoporous separator, according to an embodiment of the present invention made in accordance with Example 1.

One objective for minimizing the cost of the boehmite coating is to apply the total weight of coating that is needed to reduce the heat shrinkage to the target value, such as less than 5% shrinkage at 150° C. FIG. 2 shows that this level of heat shrinkage is obtained with an average coating thickness per side of about 1.9 microns or thicker on the 12 micron polyethylene substrate of this example. For coatings on two sides, this number is doubled to give a total coating thickness of about 3.8 microns or thicker. Based on the density of the boehmite coating determined by SEM analysis, a total coating thickness of about 3.8 microns on both sides equates to about 4.0 gsm of coating weight.

For better wetting and coating adhesion of the boehmite shiny, a corona treatment of the polyethylene substrate is preferred. Besides wire wound coating rods, a variety of other coating application methods may be used, such as, but not limited to, gravure coating, screen printer coating, reverse roll coating, blade coating, and slot die coating.

Example 2

A boehmite slurry was prepared by adding 12 parts of boehmite (DISPERAL D60 supplied by Sasol Inc., Hamburg, Germany) and 1 part of a vinyl pyrrolidone copolymer (Soteras CCS grade supplied by Ashland Inc., Wilmington, DE) to 73 parts of 9:1 water:isopropyl alcohol and stirring the slurry. The primary particle size of the boehmite was about 75 nm. The boehmite slurry was coated onto both sides of a 12 micron thick porous polyethylene separator (EP12 supplied by ENTEK, Lebanon, Oregon) using wire-wound rods of different wire thicknesses to obtain a range of coating weights for both sides from about 2.4 grams per square meter (gsm) to about 9.2 gsm. The boehmite coating was first applied to one side of the polyethylene separator and dried at 70° C. for 2 minutes in a convection oven. Then, the boehmite coating was applied to the reverse uncoated side of the polyethylene separator and dried under the same oven heating conditions as for the first coating.

Figure 3:
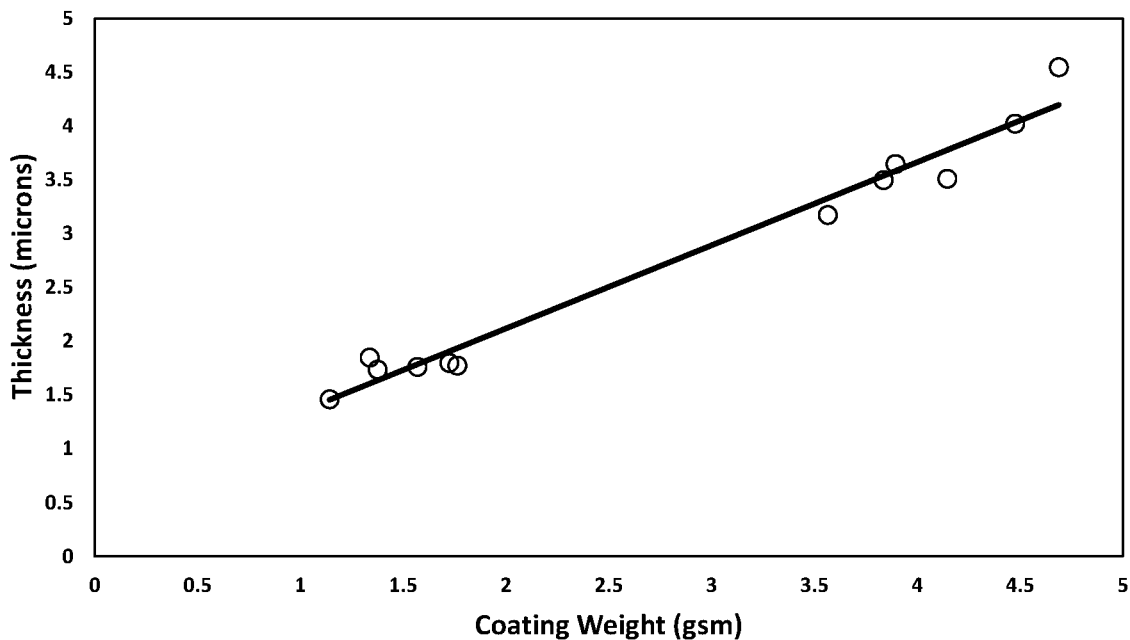
FIG. 3 is a graph of the coating thickness as a function of coating weight of a nanoporous separator, according to an embodiment of the present invention made in accordance with Example 2.

The 12:1 by weight ratio of boehmite pigment to vinyl pyrrolidone copolymer binder is calculated to have 18.7% by volume of polymer binder in the solid portion of the porous boehmite coating layer. This calculation is based on a specific gravity of 3.03 g/cc for boehmite and of 1.1 glee for the vinyl pyrrolidone copolymer, FIG. 3 shows a plot of the average boehmite coating thickness and coating weight per side of about 1.2 gsm to about 4.6 gsm. For two sided coating, these numbers are doubled to give a total coating weight range of about 2.4 gsm to about 9.2 gsm. The total boehmite coating thickness for both sides varies from about 2.8 microns to about 9.0 microns.

Figure 4:
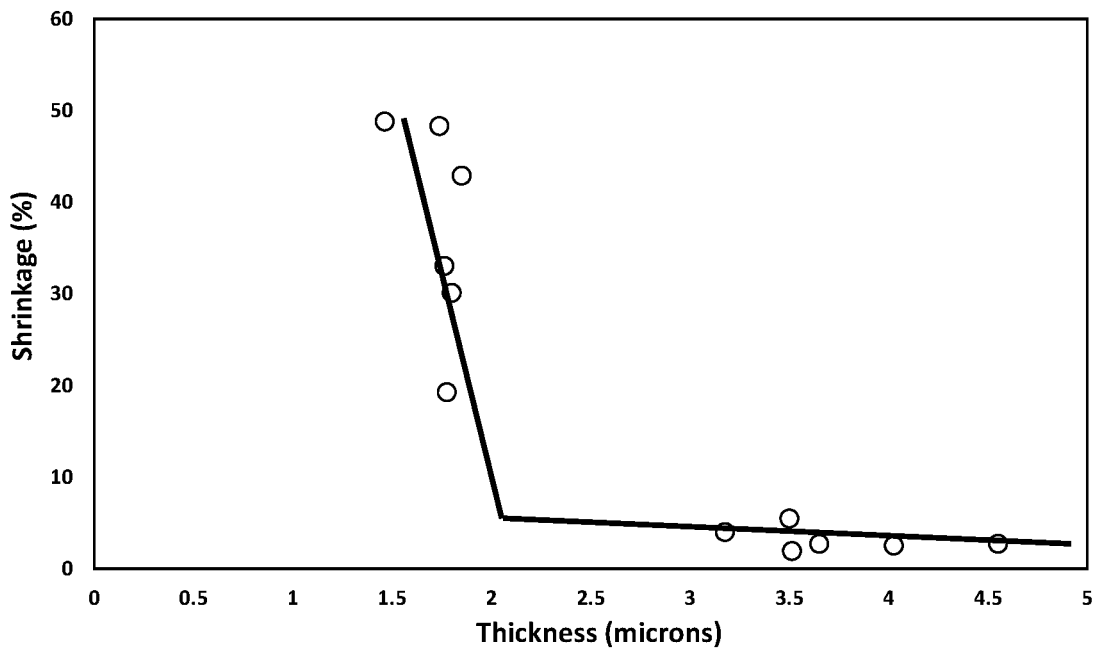
FIG. 4 is a graph of the shrinkage as a function of coating weight of a nanoporous separator, according to an embodiment of the present invention made in accordance with Example 2.

As discussed, one objective for minimizing the cost of the boehmite coating is to apply the total weight of coating that is needed to reduce the heat shrinkage to the target value, such as less than 5% shrinkage at 150° C. for 1 hour. FIG. 4 shows that this level of heat shrinkage is obtained with an average coating thickness per side of about 2.0 microns or thicker on the 12 micron polyethylene substrate of this example. For the coatings on two sides, this number is doubled to give a total coating thickness of about 4.0 microns or thicker. Based on FIG. 3, a total coating thickness of about 4.0 microns on both sides equates to about 3.9 gsm of coating weight.

Figure 5:
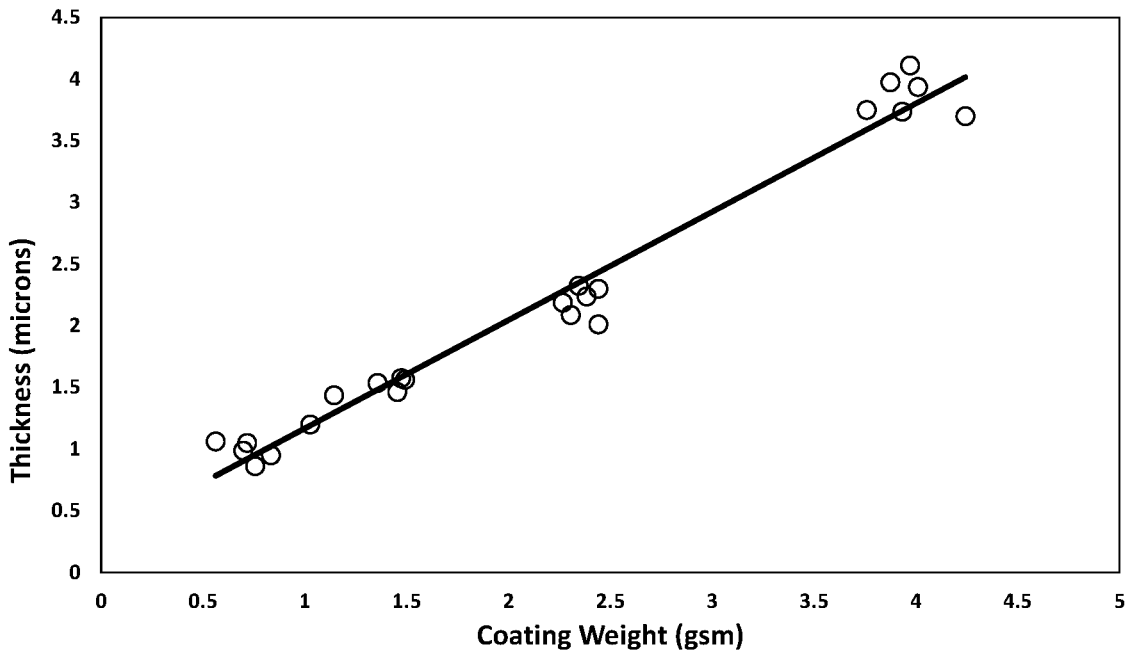
FIG. 5 is a graph of the coating thickness as a function of coating weight of a nanoporous separator, according to an embodiment of the present invention made in accordance with Example 2.
Figure 6:
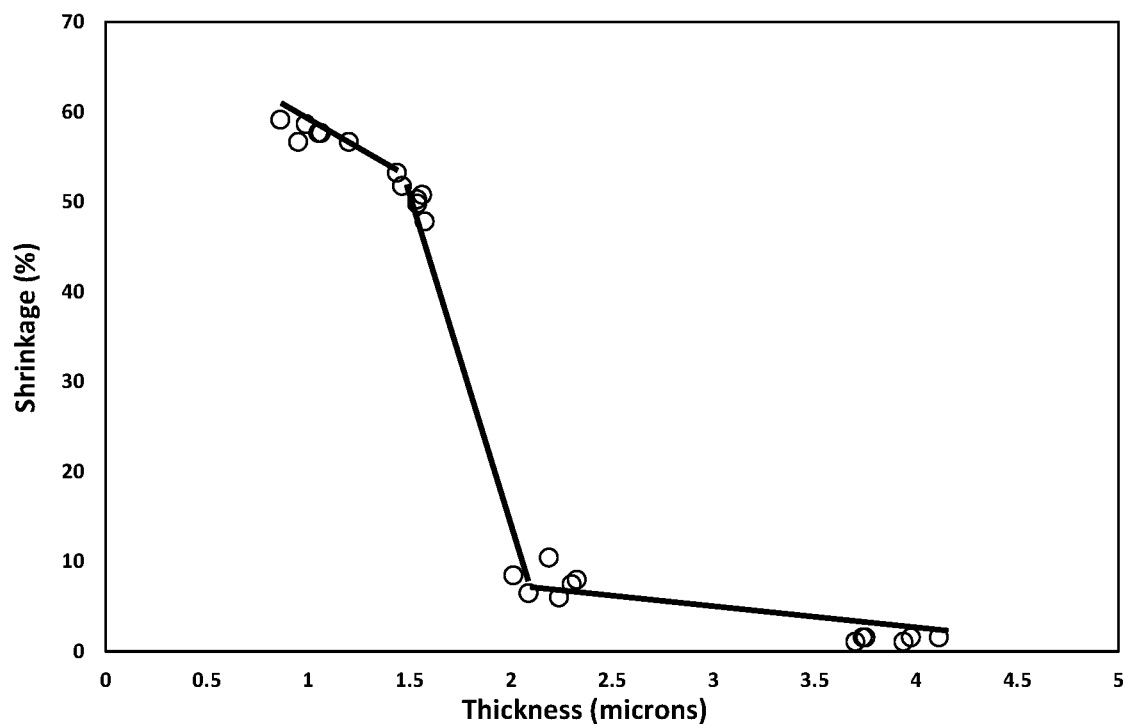
FIG. 6 is a graph of the shrinkage as a function of coating weight of a nanoporous separator, according to an embodiment of the present invention made in accordance with Example 2.

A boehmite shiny of an 8 to 1 ratio by weight of the DISPERAL D60 to vinyl pyrrolidone copolymer in 9:1 water:isopropyl alcohol at 15% solids was also coated using wire wound rods on the 12 micron polyethylene substrate and dried, as for the 12:1 boehmite D60:polymer coating in this example. It was calculated to have a volume percent of polymer binder of 25.6%, FIG. 5 shows a plot of the average boehmite coating weight and coating thickness per side of about 0.8 gsm to about 4.2 gsm. For the coatings on two sides for this boehmite coating with a 8:1 boehmite pigment:vinyl pyrrolidone polymer binder ratio by weight, these numbers are doubled to give a range of about 1.6 gsm to 8.4 gsm. The corresponding total boehmite coating thicknesses for both sides varies from about 1.6 microns to 8.2 microns. FIG. 6 shows that a less than 5% shrinkage at 150° C. for 1 hour is obtained with an average coating thickness per side of about 2.2 microns or thicker. For the coatings on two sides, this number is doubled to give a total coating thickness on both sides of about 4.4 microns or thicker. Based on FIG. 5, a total coating thickness of about 4.4 microns equates to about 4.8 gsm of coating weight.

Example 3

Figure 7:
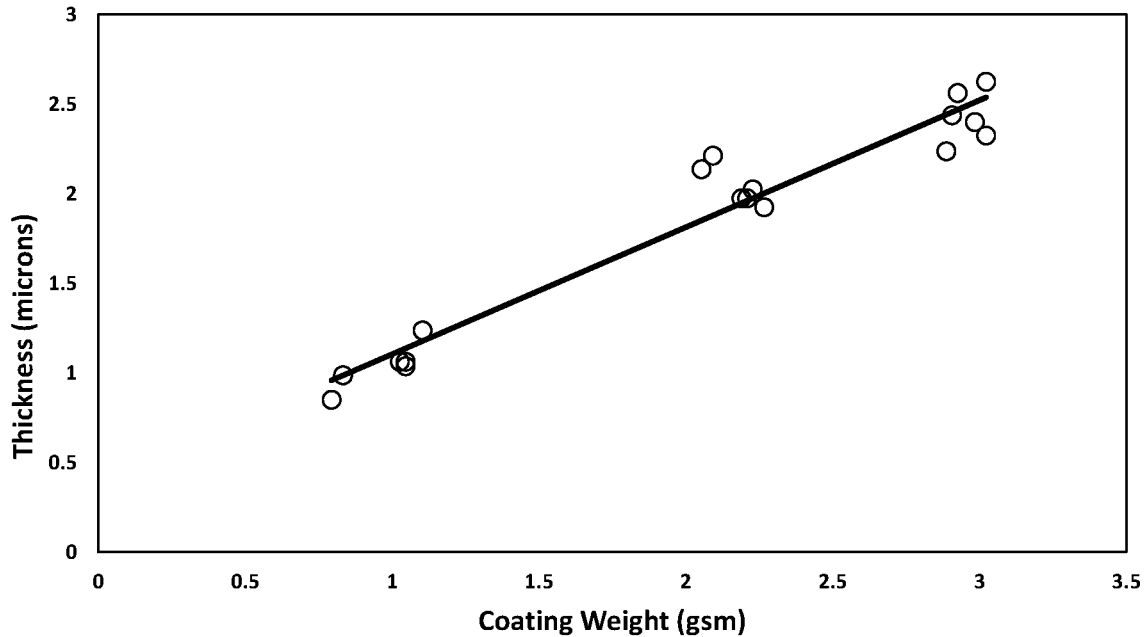
FIG. 7 is a graph of the coating thickness as a function of coating weight of a nanoporous separator, according to an embodiment of the present invention made in accordance with Example 3.
Figure 8:
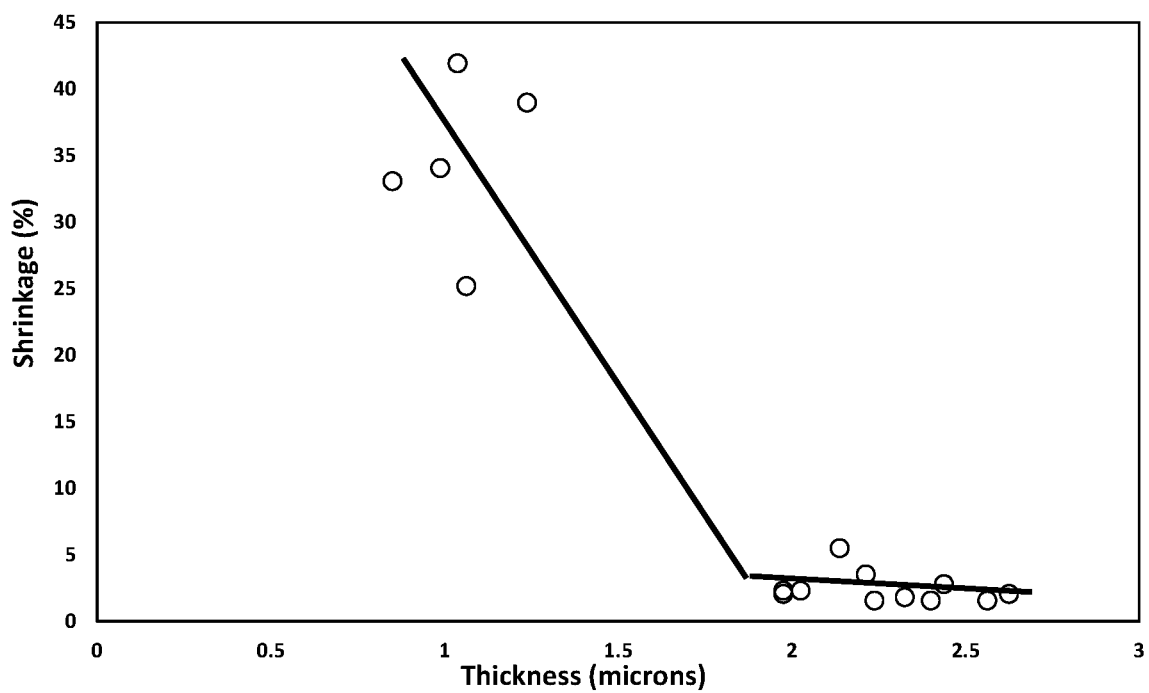
FIG. 8 is a graph of the shrinkage as a function of coating weight of a nanoporous separator, according to an embodiment of the present invention made in accordance with Example 3.

Using the procedure of Example 2, a boehmite slurry of a 12:1 by weight of DISPAL 25F4 boehmite and the vinyl pyrrolidone copolymer in 9:1 water:isopropyl alcohol at 15% solids was prepared. The DISPAL 25F4 is supplied by Sasol, Lake Charles, LA, and has a primary crystallite particle size of 8 nm. This boehmite slurry was coated on the EP12 12 micron polyethylene substrate from ENTEK and dried, similarly to the process used in Examples 1 and 2. It was calculated to have a volume percent of polymer binder of 18.7%. FIG. 7 shows a plot of the average boehmite coating thickness and the coating weight per side of about 0.8 gsm to about 3.0 gsm. For the coatings on two sides for this boehmite coating with a 12:1 boehmite pigment:vinyl pyrrolidone polymer binder ratio by weight, these numbers are doubled to give a total coating weight range of about 1.6 gsm to about 6.0 gsm. FIG. 8 shows that a less than 5% shrinkage at 150° C. for 1 hour is obtained with an average coating thickness per side of about 1.8 microns or thicker. For two sided coatings, this number is doubled to give a total coating thickness on both sides of about 3.6 microns or thicker Based on FIG. 7, a total coating thickness of about 3.6 microns equates to about 3.6 gsm.

Figure 9:
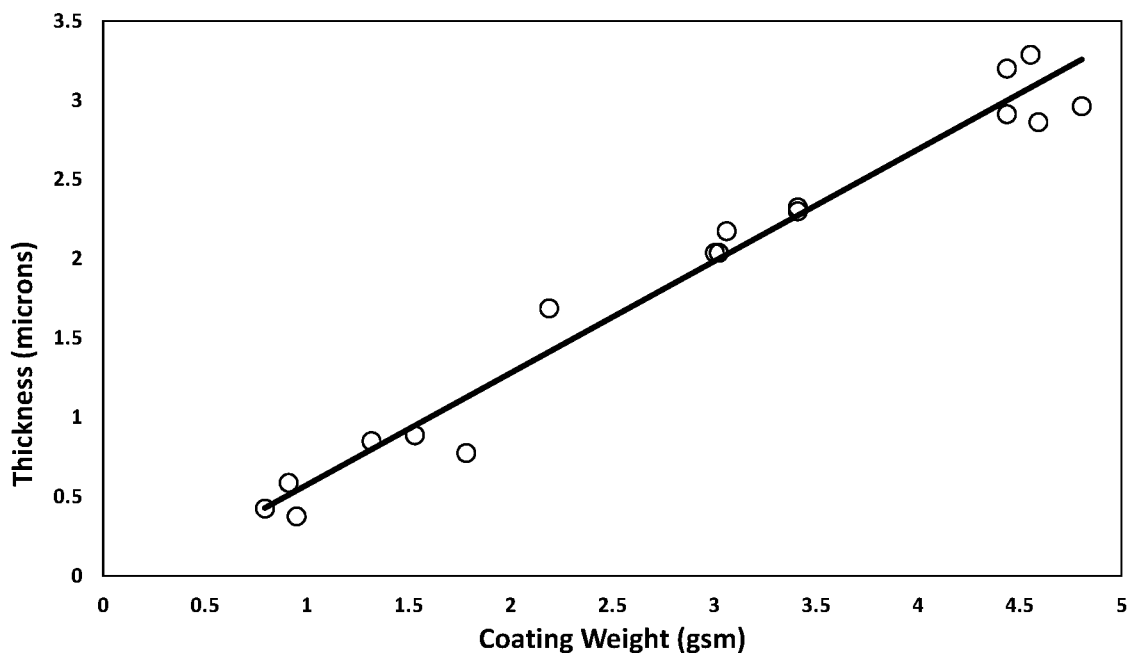
FIG. 9 is a graph of the coating thickness as a function of coating weight of a nanoporous separator, according to an embodiment of the present invention made in accordance with Example 3.
Figure 10:
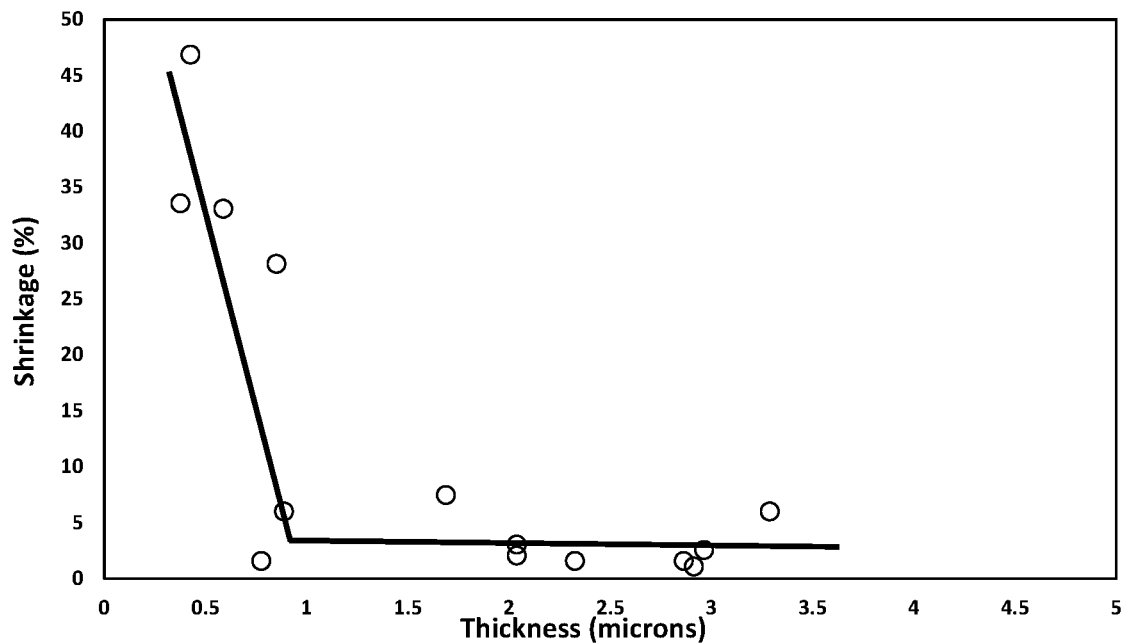
FIG. 10 is a graph of the shrinkage as a function of coating weight of a nanoporous separator, according to an embodiment of the present invention made in accordance with Example 3.

A boehmite slurry of an 8 to 1 ratio by weight of the DISPAL 25F4 to vinyl pyrrolidone copolymer in 9:1 water: isopropyl alcohol was also coated on the 12 micron polyethylene substrate and dried, similarly to the process used in Examples 1 and 2. It was calculated to have a volume percent of polymer binder of 25.6%. FIG. 9 shows a plot of the average boehmite coating thickness and coating weight per side of about 0.8 gsm to about 4.7 gsm. For the coatings on two sides for this boehmite coating with a 8:1 boehmite pigment:vinyl pyrrolidone polymer binder ratio by weight, these numbers are doubled to give a total coating weight range of about 1.6 gsm to 9.4 gsm. FIG. 10 shows that a less than 5% shrinkage at 150° C. for 1 hour is obtained with an average coating thickness per side of about 0.9 microns or thicker. For the coatings on two sides, this number is doubled to give a total coating thickness on both sides of about 1.8 microns or thicker. Based on FIG. 9, a total coating thickness of about 1.8 microns equates to about 2.9 gsm of coating weight. For a thickness of about 1.8 microns of the boehmite coating, the coating weight should have been about 2.0 gsm based on the density of the boehmite coating of about 1.1 g/cc shown in Example 1, while factoring in the lower boehmite weight % of the 8:1 boehmite pigment:vinyl pyrrolidone copolymer and the higher vinyl pyrrolidone copolymer weight % and lower density of the vinyl pyrrolidone copolymer compared to chitosan. This shows that about 0.9 gsm of the boehmite coating penetrated into and dried in the pores of the polyethylene substrate to produce a boehmite/polyethylene substrate with a boehmite coating on its surface. At the 8:1 pigment:binder (P:B) ratio of this coating, the about 0.9 gsm of boehmite coating in the pores equates to about 0.8 gsm of boehmite particles in the pores of the boehmite/polyethylene substrate or layer. Since this boehmite coating was applied on both sides of the polyethylene substrate, about one-half, or about 0.4 gsm of boehmite, would have penetrated and dried in the pores on each side of the polyethylene substrate to form the boehmite/polyethylene substrate or layer that resulted in a boehmite-coated boehmite/polyethylene substrate.

A similar 8:1 boehmite coating with Dispal 25F4, with chitosan substituted for the vinyl pyrrolidone copolymer and a 12 micron thick polyethylene substrate from Shenzhen Senior, Shenzhen, China, used instead of the polyethylene substrate from Entek, was made using the procedure of this Example to give a coat weight of 1.8 gsm. This coating had a heat shrinkage of less than 5% when heated at 150° C. for 1 hour. When the procedure of removing the boehmite coating with an adhesive tape was used, even with very careful tape pulls, it was not possible to remove the boehmite coating from the 10×10 cm samples without pulling off some of the polyethylene substrate. This was in contrast to the tape pull results of easy and complete removal of the boehmite coatings from the polyethylene substrate for Examples 1 and 2 and Comparative Examples 1 and 2. This result was consistent with some of the boehmite coating penetrating into the pores of the polyethylene layer and, upon drying, providing increased adhesive and cohesive strength to the boehmite coating such that the point of failure in the tape pull was below the surface of the polyethylene layer at most areas, rather than at the interface of the polyethylene surface and the boehmite coating on the polyethylene surface. After the tape pull, some areas were found where the polyethylene layer had not been disturbed. From these areas, the added thickness of the boehmite layer was found to be about 1.8 microns.

Since the tape pulls were not able to cleanly remove the boehmite coating from the polyethylene layer, a methanol-saturated soft cloth was used to wash and rub the coating off. The 10×10 cm sample after washing had a weight of 0.0757 grams (g). Two more methanol rubs did not change this weight of the washed and rubbed sample. The polyethylene substrate used in this Example contained no inorganic pigment, such as alumina or boehmite. A furnace combustion of the methanol-washed sample in a crucible, at a temperature of 1000° C. for 70 minutes showed 0.0045 g of anhydrous aluminum oxide after dehydrating the boehmite pigment with a weight loss of 15% of the boehmite pigment weight. Using this boehmite to aluminum oxide conversion factor by dividing the aluminum oxide weight by 0.85, this gives a boehmite content of about 0.0053, or at least about 0.53 gsm of boehmite pigment in the pores of the polyethylene layer. Since the wet rubbing to remove the boehmite coating on the surface may have removed a small amount of the boehmite coating in the upper pores of the polyethylene layer, it is possible that the weight of boehmite pigment in the pores was somewhat greater than 0.53 gsm. Since there were two coatings on the polyethylene layer, the amount of boehmite in the pores from a single coating is about one-half of this total, or about 0.27 gsm. As further evidence for penetration of the boehmite coating into the pores of the polyethylene substrate, the dimensional stability of this "washed" polyethylene with about 0.53 gsm of boehmite in the pores after heating at 150° C. for 1 hour was 54% and 36.5% in the two directions(—machine direction (MD) and cross direction (CD)). By contrast, the polyethylene substrate before coating showed heat shrinkage of 70% and 75.5%. This increased heat stability with boehmite pigment in the pores of the polyethylene substrate is one explanation for the greater dimensional stability at 150° C. with a much lower coat weight and coating thickness added to the surface of the polyethylene layer. For analyzing the presence and amount of boehmite particles in the pores of the polymeric layer, the removal of the surface coating of the nanoporous layer and subsequent combustion of all of the organic polymer, as described above, in a combustion and/or thermogravimetric method may be used for the case of only boehmite particles in the nanoporous layer and a polymer layer that contained no inorganic or boehmite particles before the application of the boehmite coating. Another method is to use the TEM or SEM method used for measuring the average crystallite size to make images of the presence of boehmite particles in the pores of the polymeric layer and to determine their crystallite size at the same time. Combining this method with the combustion and/or thermogravimetric method above to quantify the weight of the boehmite, or other ceramic particles in the pores, if any, would provide the weight in gsm of boehmite particles in the separator. The known analytical techniques for boehmite particles, such as FTIR, X-ray diffraction, thermogravimetric analysis (TGA), high resolution photoelectron spectroscopy (ESCA), and $^{27}$Al nuclear magnetic resonance (nmr) can be utilized to further confirm the presence and quantity of boehmite particles in the pores of the polymeric layer, if needed. An alternative approach for collecting the ceramic particles, such as boehmite particles, in the pores of the polymeric layer, after removing any surface coating from the polymeric layer, would be to do a Soxhlet extraction of the polymeric layer with a hot solvent that dissolves the polymer from the polymeric layer to isolate the insoluble inorganic particles. Besides providing the weight of inorganic particles, this could be combined with the above analytical methods, combustion and/or thermogrametric analysis, and TEM or SEM method, to confirm the presence and quantity of boehmite particles. One benefit of this penetration of nano-sized boehmite particles would be the ability to make and sell boehmite/polyethylene substrates, with no or minimal surface boehmite or other coating, for various applications, including for manufacturing CCS, where the boehmite/polyethylene substrate would have multiple advantages over polyethylene substrates, including, but not limited to, a much greater dimensional stability at high heats, a modified and smaller pore size distribution, and other benefits, such as ease of wetting by subsequent coatings. One example of a particularly useful application for boehmite/polymeric substrates would be filtration applications, where the very small nano-sized boehmite particles, with and without various surface treatments, in the pores of the polymer could provide the desired nanofiltration and ultrafiltration properties not available from the polymeric substrate without boehmite particles in its pores, and could be adapted for desalination of sea water. This benefit would also be available for other boehmite/polymeric substrates besides polyethylene, such as for boehmite/polypropylene and boehmite/other polyolefin substrates.

Example 4

Figure 11:
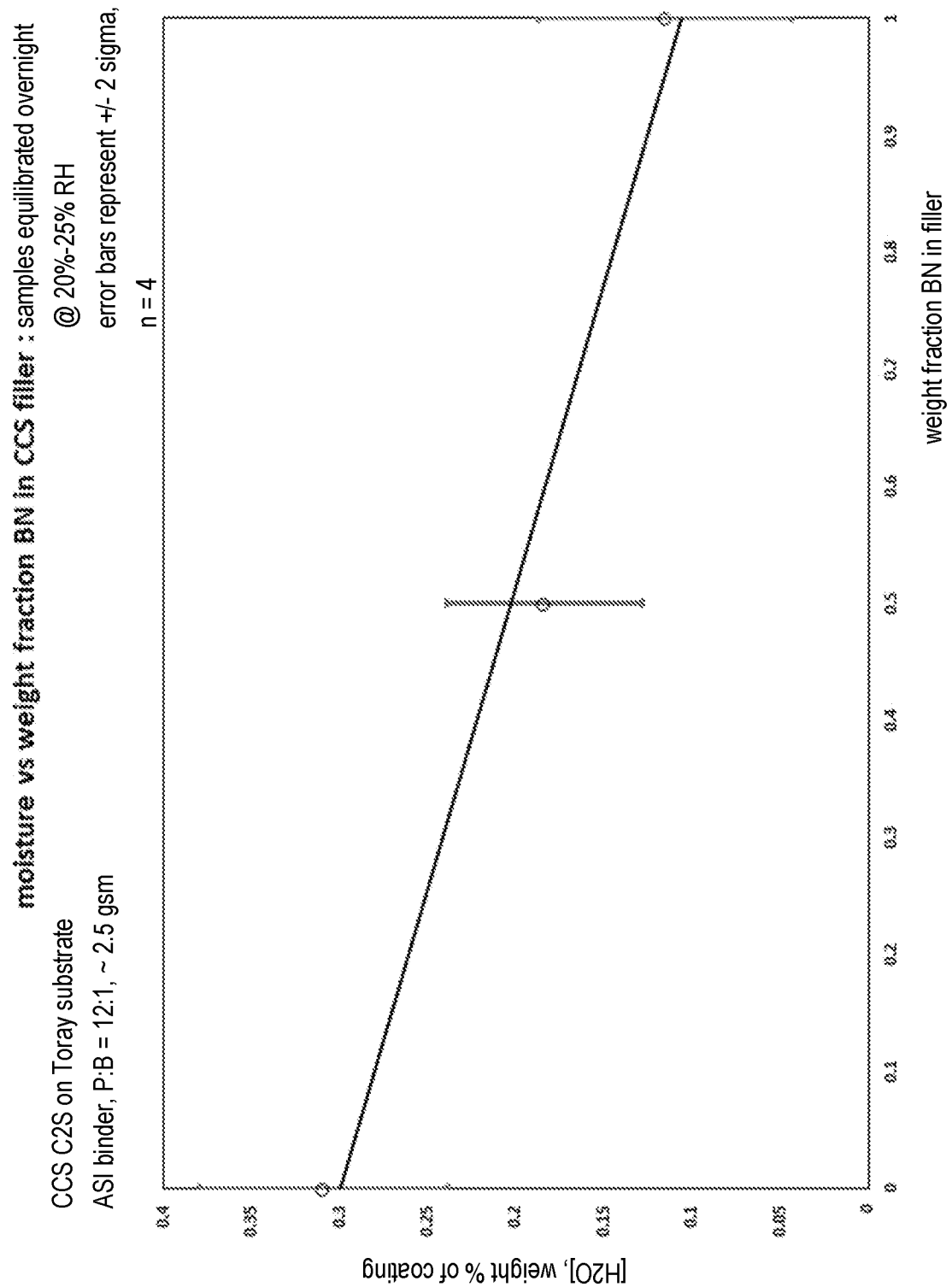
FIG. 11 is a graph of the moisture content as function of the weight fraction of boron nitride in a nanoporous separator, according to an embodiment of the present invention made in accordance with Example 4.

The procedure of Example 1 was used to make a nanoporous separator comprising a 50:50 blend by weight of boehmite and boron nitride pigments, except that a 12 micron thick porous polyethylene separator from Toray Industries, Tokyo, Japan, was substituted for the Entek polyethylene separator, and the vinyl pyrrolidone polymer, Soteras CCS, was substituted for the chitosan. The boron nitride pigment was NX1, supplied by Momentive Performance Materials. The total coating weight on both sides was 2.5 gsm. FIG. 11 shows the reduced water content of this separator compared to the control with only boehmite pigment and no boron nitride. Specifically, as shown in FIG. 11, at a 50:50 by weight ratio of boehmite and boron nitride, the water content at 20% RH was reduced by one-third from its value with boehmite pigment only.

Comparative Example 1

An alumina mix was prepared in water by adding 20 parts of alumina pigment (HJA-0719 supplied by AnHui Estone Materials Technology Co., Ltd., Anhui Province, China) and 1 part of a hydroxypropyl cellulose polymer (Klucel H grade supplied by Ashland Inc., Wilmington, DE) to 63 parts of water and stirring the slurry. This 20:1 weight ratio of pigment to binder provided a similar Gurley air permeability and similar ionic conductivity in electrolyte as the 8:1 weight ratio of pigment to binder in Example 2. Reducing the 20:1 weight ratio had a progressively negative effect with higher Gurley air permeability and lower ionic conductivity. The primary particle size of the alumina was greater than 400 nm. The alumina mix was coated onto both sides of a 12 micron thick porous polyethylene separator (EP12 supplied by ENTEK, Lebanon, Oregon) using wire-wound rods of different wire thicknesses to obtain a range of total coating weights for both sides from about 0.8 grams per square meter (gsm) to about 4.4 gsm. The alumina coating was first applied to one side of the polyethylene separator and dried at 70° C. for 2 minutes in a convection oven. Then, the alumina coating was applied to the reverse uncoated side of the polyethylene separator and dried under the same oven heating conditions as for the first coating.

The 20:1 by weight ratio of alumina pigment to hydroxypropyl cellulose polymer binder is calculated to have 13.6% by volume of polymer hinder in the solid portion of the porous alumina coating layer. This calculation is based on a specific gravity of 4.0 g/cc for alumina and of 1.27 g/cc for the hydroxypropyl cellulose polymer. At a total coating weight of about 4.4 gsm, this alumina coating had a shrinkage of about 60% at 150° C. for 1 hour.

Comparative Example 2

A boehmite mix was prepared in water by adding 20 parts of boehmite pigment (BG-613 supplied by AnHui Estone Materials Technology Co., Ltd., Anhui Province, China) and 1 part of a hydroxypropyl cellulose polymer (Mucci H grade supplied by Ashland. Inc., Wilmington, DE) to 63 parts of water and stirring the slurry. This 20:1 weight ratio of pigment to binder provided a similar Gurley air permeability and similar ionic conductivity in electrolyte as the 8:1 weight ratio of pigment to binder in Example 2. Reducing the 20:1 weight ratio had a progressively negative effect with higher Gurley air permeability and lower ionic conductivity. The primary particle size of the boehmite was greater than 400 nm. The boehmite mix was coated onto both sides of a 12 micron thick porous polyethylene separator (EP12 supplied by ENTEK, Lebanon, Oregon) using wire-wound rods of different wire thicknesses to obtain a range of total coating weights for both sides from about 0.8 grams per square meter (gsm) to about 7.0 gsm. The boehmite coating was first applied to one side of the polyethylene separator and dried at 70° C. for 2 minutes in a convection oven. Then, the alumina coating was applied to the reverse uncoated side of the polyethylene separator and dried under the same oven heating conditions as for the first coating.

The 20:1 by weight ratio of boehmite pigment to hydroxypropyl cellulose polymer binder is calculated to have 10.7% by volume of polymer binder in the solid portion of the porous boehmite coating layer. This calculation is based on a specific gravity of 3.03 g/cc for boehmite and of 1.27 g/cc for the hydroxypropyl cellulose polymer. At a total coating weight of about 7.0 gsm, this boehmite coating had a shrinkage of about 60% at 150° C. for 1 hour.

Table 1 shows a summary of the data from Examples 1 to 3.

TABLE 1

| Example | Boehmite Type | Primary Particle Size (nm) | Pigment: Polymer Binder Weight Ratio | Volume % Polymer | Total Coat Weight for <5% Shrinkage at 150° C. for 1 hour |
|---|---|---|---|---|---|
| 1 | 10F4 | 40 | 12:1 | 15.3% | ≥4.0 gsm |
| 2 | D60 | 75 | 12:1 | 18.7% | ≥3.9 gsm |
| 2 | D60 | 75 | 8:1 | 25.6% | ≥4.8 gsm |
| 3 | 25F4 | 8 | 12:1 | 18.7% | ≥3.6 gsm |
| 3 | 25F4 | 8 | 8:1 | 25.6% | ≥2.9 gsm |

One challenge in using nano-sized ceramic particles, such as nano-sized boehmite particles, is their increased tendency to absorb water because of their much larger surface areas compared to micro-sized ceramic particles, such as micro-sized alumina and micro-sized boehmite particles. For lithium ion cells, lithium metal cells, and other electrochemical cells with sensitivity to water content, the separator needs to have a low water content, such as under 600 ppm of water in the separator, preferably less than 300 ppm of water, and more preferably under 100 ppm of water as typically found in porous polymer only separators with no ceramic materials in them. Although vacuum drying of the separator at up to 80° C. can help to lower this moisture content in separators with nano-sized ceramic particles, and the separators of this invention have increased thermal stability that permits even higher vacuum drying temperatures of up to 90° C. to about 110° C., some users of separators may prefer not to perform this extra step of vacuum drying. It would be preferable if the greater heat stability, lower cost from the use of a lower amount of ceramic coating materials, and lower ceramic coating thickness, including from the penetration of the ceramic coating and ceramic particles into the porous polymeric separator layer, of the separators of this invention would include a lower moisture content in the separators from the use of more hydrophobic ceramic particles and organic polymers. Having a lower amount of ceramic particles from the lower coating weights of the invention is a significant benefit for lowering the moisture content of the separator, but it would be further useful if the ceramic particles were more hydrophobic and less prone to moisture pickup.

One approach which provides this lower moisture absorption is to treat the surface of the ceramic particles with a hydrophobic material, such as by using hydrophobically-treated boehmite particles, particularly if the hydrophobic material is chemically reacted with the boehmite particles and thus is permanently bonded to the boehmite particles. Suitable hydrophobic materials for chemical modification of boehmite pigments include, but are not limited to, organic sulfonic acids, organic carbonates, and polymers with hydrophobic groups and with reactive groups, such as carboxylic acid and hydroxyl groups, that can be made to react with hydroxyl groups of the boehmite or other ceramic particles.

Examples of the organic sulfonic acid-treated boehmite particles include Dispal® 25SR, available from Sasol in Lake Charles, LA, a boehmite pigment chemically rented with p-toluene sulfonic acid through the sulfonic acid groups. The reaction leaves the hydrophobic p-toluene group on the outer surface of the boehmite particle to make it less prone to pick up water. An even more hydrophobic example from Sasol is p-dodecylbenzene sulfonic acid surface reacted to boehmite particles through the sulfonic acid group and having the very hydrophobic dodecyl group on the outer surface of the boehmite pigment. This makes the boehmite particles so hydrophobic that this treated boehmite can be dispersed in hydrocarbon solvents. The use of boehmite particles surface treated with organic sulfonic acids in boehmite coatings for separators is disclosed in U.S. Patent Application Publication No. 2013/0171500 by Xu et al.

Examples of the organic carbonate-treated boehmite particles include, but are not limited to, those with ethylene carbonate and fluoroethylene carbonate as the organic carbonates. Besides the option of choosing an organic carbonate that is very hydrophobic in the part of the molecule that will face away from the surface of the boehmite, the choice can also be made with a view to picking an organic carbonate which will provide increased ionic conductivity to the separator. The use of boehmite particles surface treated with ethylene carbonate to provide separators with increased conductivity is described in U.S. Pat. No. 8,883,354 to Carlson et al.

The use of boehmite particles surface treated with organic polymers to provide separators is described in U.S. Pat. No.

9,871,239, to Carlson et al. As the primary crystallite size and resulting pore size become smaller in the boehmite separators and the ionic conductivity of the separator becomes lower because of the smaller pore sizes, it is useful to have surface treatments, such as the three types described above, that can be utilized to increase the ionic conductivity of the separator, as well as to decrease the water content of the separator.

The preparation of a ceramic mix or slurry with the surface-treated hydrophobic materials can be done conveniently by adding a precursor, such as an organic carbonate, to the slurry containing the untreated boehmite particles and heating the slurry to a temperature, such as 80° C., for a sufficient time, such as 1 hour, to react the surface treatment material, such as an organic carbonate, with the boehmite particles to the desired level of surface treatment. There is no need to isolate the surface-treated boehmite particles by a drying process, but rather the slurry can be used as is, usually after some dilution with water and/or solvents to the desired % solids level for the coating of the porous polymer substrate. If it is desired to further reduce the particle size of the ceramic particles, such as boehmite particles, and/or to homogenize the slurry for more uniformity and perhaps a lower viscosity at the desired % solids level for coating, the slurry, before and/or after any surface treatment, can be further mixed in an impingement mill or similar milling device. Examples of the use of an impingement mill for reducing and homogenizing coating mixes containing pigments is described in U.S. Pat. Nos. 5,210,114 and 5,292,588, to Katsen.

While the invention has been described in detail and with reference to specific and general embodiments thereof, it will be apparent to one skilled in the art that various changes and modifications can be made therein without departing from the spirit and scope thereof.

The invention claimed is:

1. A separator for a lithium battery comprising: (a) a porous polymeric layer, and (b) a second porous layer adjacent said porous polymeric layer, wherein said second porous layer comprises hydrophobic inorganic oxide particles and one or more polymers, wherein 0.27 grams, or greater, per square meter of hydrophobic inorganic oxide particles are disposed within the pores of the porous polymeric layer, and wherein the amount of water in the separator is no more than 600 parts per million.

2. The separator of claim 1, wherein the hydrophobic inorganic oxide particles comprise boehmite.

3. The separator of claim 2, wherein the second porous layer comprises an organic carbonate treated boehmite.

4. The separator of claim 3, wherein the organic carbonate reacts with hydroxyl groups of the boehmite.

5. The separator of claim 3, wherein the organic carbonate is ethylene carbonate or fluoroethylene carbonate.

6. The separator of claim 1, wherein the inorganic oxide particles have a crystallite size of about 30 nm to about 90 nm.

7. The separator of claim 2, wherein the boehmite has a crystallite size of about 30 nm to about 50 nm.

8. The separator of claim 1, wherein the amount of water in the separator is no more than 300 parts per million of water.

9. The separator of claim 1, wherein the amount of water in the separator is no more than 100 parts per million of water.

10. The separator of claim 1, wherein the second porous layer is a nanoporous layer.

11. The separator of claim 1, wherein the total coating weight of said second porous layer is less than 4.5 grams per square meter.

12. The separator of claim 1, wherein the wherein an average crystallite size of said inorganic particles disposed within the pores of said second porous polymeric layer is between 5 nm and 90 nm.

* * * * *